US012031377B2

(12) United States Patent
Madureira

(10) Patent No.: US 12,031,377 B2
(45) **Date of Patent: *Jul. 9, 2024**

(54) CORNER WINDOW LITE ASSEMBLIES

(71) Applicant: AV BUILDER CORP, San Diego, CA (US)

(72) Inventor: Antonio V. Madureira, San Diego, CA (US)

(73) Assignee: AV BUILDER CORP, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/942,834

(22) Filed: Sep. 12, 2022

(65) Prior Publication Data

US 2023/0003079 A1 Jan. 5, 2023

Related U.S. Application Data

(63) Continuation of application No. 17/077,384, filed on Oct. 22, 2020, now Pat. No. 11,459,816.

(60) Provisional application No. 62/943,559, filed on Dec. 4, 2019, provisional application No. 62/925,674, filed on Oct. 24, 2019.

(51) Int. Cl.

| | |
|---|---|
| ***E06B 3/96*** | (2006.01) |
| ***E06B 3/964*** | (2006.01) |
| *E06B 3/968* | (2006.01) |

(52) U.S. Cl.

CPC .......... *E06B 3/9644* (2013.01); *E06B 3/9645* (2013.01); *E06B 3/9647* (2013.01); *E06B 3/968* (2013.01)

(58) Field of Classification Search

CPC .... E06B 3/6941; E06B 3/9644; E06B 3/9645; E06B 3/9646; E06B 3/9647; E06B 3/9648; E06B 3/968; E06B 3/9681; E06B 3/9682; E06B 3/9687; E06B 3/9688

USPC ........................................................ 52/656.9

See application file for complete search history.

(56) References Cited

U.S. PATENT DOCUMENTS

| | | | |
|---|---|---|---|
| 949,394 | A | 2/1910 | Daly |
| 2,375,910 | A | 5/1945 | Foward |
| 4,228,630 | A | 10/1980 | Englert et al. |
| 5,170,977 | A | 12/1992 | McMillan |
| 5,283,978 | A | 2/1994 | Horgan, Jr. |
| 5,319,882 | A | 6/1994 | Biebuyck |
| 5,966,891 | A | 10/1999 | Fagan et al. |

(Continued)

FOREIGN PATENT DOCUMENTS

| | | | |
|---|---|---|---|
| CN | 202202739 | U | 4/2012 |
| CN | 208441698 | U | 1/2019 |

(Continued)

OTHER PUBLICATIONS

FDR Atlanta Factory Direct Remodeling of Atlanta, retrieved from http://fdratlanta.com/gallery-sun-rooms.asp?Page=5, 3 pages (date unknown).

(Continued)

*Primary Examiner* — James J Buckle, Jr.

(74) *Attorney, Agent, or Firm* — Procopio, Cory, Hargreaves & Savitch LLP

(57) ABSTRACT

Window lite assemblies and methods for installing the assemblies are provided herein. The assemblies described herein are configured to be installed in new and existing buildings, especially in building corners, while leaving some or all of the horizontal structural members such as headers and sills in place.

18 Claims, 11 Drawing Sheets

(56) References Cited

U.S. PATENT DOCUMENTS

| | | | |
|---|---|---|---|
| 6,158,182 | A | 12/2000 | Biebuyck |
| 6,269,600 | B1 | 8/2001 | Tambakakis |
| 6,591,570 | B2 | 7/2003 | Miller, Jr. |
| 6,715,248 | B2 | 4/2004 | Biebuyck |
| 6,745,527 | B1 | 6/2004 | Sherman et al. |
| 6,993,873 | B2 | 2/2006 | Biebuyck et al. |
| 7,389,617 | B2 | 6/2008 | Grunewald |
| 7,497,057 | B1 | 3/2009 | Hansen et al. |
| 7,617,650 | B1 | 11/2009 | Hansen et al. |
| 7,631,471 | B2 | 12/2009 | Grunewald et al. |
| 7,634,889 | B1 | 12/2009 | diGirolamo et al. |
| 8,739,476 | B1 | 6/2014 | Royer |
| 8,915,032 | B1 | 12/2014 | Rivera et al. |
| 9,038,339 | B2 | 5/2015 | Zhong |
| D819,832 | S | 6/2018 | Kato |
| 10,066,384 | B1 | 9/2018 | Hendry |
| 10,184,264 | B2 | 1/2019 | Hunt et al. |
| 10,422,140 | B2 | 9/2019 | Mitchell |
| 2002/0062616 | A1 | 5/2002 | Ocampo |
| 2006/0286317 | A1 | 12/2006 | Berkowitz |
| 2009/0266014 | A1 | 10/2009 | Green |
| 2015/0225919 | A1 | 8/2015 | Wagler |
| 2016/0281415 | A1 | 9/2016 | Massey |

FOREIGN PATENT DOCUMENTS

| | | | |
|---|---|---|---|
| JP | 08-199915 | A | 8/1996 |
| JP | 2007-023481 | A | 2/2007 |
| JP | 2013234481 | A | 11/2013 |

OTHER PUBLICATIONS

Dynamic Architectural Windows & Doors, retrieved from https://www.dynamicwindows.com/product-lines/all-wood-series/corner-windows/, 1 page (date unknown).

Silver Spray, Evolving plans and ideas for a Perranporth Eco Build, retrieved from http://www.silverspray.co.uk/2012/05/25/corner-window-ideas/, 8 pages (May 25, 2012).

Miller, L. Sunny Side In: Sunroom Design Trends and Tips, retrieved from https://freshome.com/sunroom-design-trends-tips/, 3 pages (Jan. 27, 2016).

Nilsson, E. Sunroom Contractors, Four Seasons Sunroom Design Ideas, retrieved from https://donpedrobrooklyn.com/sunroom-design-ideas/, 11 pages (Sep. 16, 2019).

Editor's Corner: Colonel Mustard, in the Conservatory, with a Candlestick, retrieved from https://episystechpubs.com/2017/03/01/editors-corner-colonel-mustard-in-the-conservatory-with-a-candlestick/, 3 pages (Mar. 1, 2017).

DK Hardware.com, retrieved from https://www.dkhardware.com/steel-surface-mount-stanchion-for-up-to-72-barrier-corner-post-bplst30-product-42237.html, 1 page (date unknown).

Aluminum Clad Wood 90 Degree Corner Window Options • OT Glass, retrieved from http://www.otglass.com/2014/02/aluminum-clad-wood-90-degree-corner-window-options/, 13 pages (Nov. 1, 2019).

International Preliminary Report on Patentability for corresponding PCT Application PCT/US2020/057024 dated Dec. 22, 2021 (3 pages).

Office Action dated Jan. 19, 2022 in related U.S. Appl. No. 17/077,384, in 21 pages.

Extended European Search Report for EP Application No. 20879114.5 dated Nov. 22, 2022 in 9 pages.

Office Action dated Jun. 7, 2023 in related CN Patent Application No. 2020800803719, together with a brief English translation, in 8 pages.

Search Report dated Jun. 1, 2023 in related CN Patent Application No. 2020800803719, together with an English translation, in 4 pages.

Office Action dated Nov. 8, 2023 in Chinese Patent Application No. 2020800803719.

Office Action dated Jun. 19, 2023 in Canadian Patent Patent Application No. 3,155,302.

Office Action dated Feb. 26, 2024 in Korean Patent Application No. 10-2022-7016879.

Office Action dated Mar. 23, 2024 in Chinese Patent Application No. 2020800803719.

CORNER WINDOW LITE ASSEMBLIES

CROSS REFERENCE TO RELATED APPLICATIONS

This application is a continuation of U.S. patent application Ser. No. 17/077,384, filed on Oct. 22, 2020, which claims priority to U.S. provisional patent application Ser. No. 62/925,674, filed on Oct. 24, 2019, and U.S. provisional patent application Ser. No. 62/943,559, filed on Dec. 4, 2019. These and all other extrinsic materials discussed herein are incorporated by reference in their entirety. Where a definition or use of a term in an incorporated reference is inconsistent or contrary to the definition of that term provided herein, the definition of that term provided herein applies and the definition of the term in the reference does not apply.

FIELD OF THE INVENTION

The field of the invention is window assemblies, and in particular corner and/or curved window assemblies and methods of retrofitting existing conventionally framed structures and installing new conventionally frame constructions with such assemblies.

BACKGROUND

Installation of windows can substantially increase the aesthetic appeal and monetary value of a building. This is especially true when the building is located in an area that provides for desirable views. One area of a building where windows are generally not found is in a corner space. Even where large windows or sliding doors are placed adjacent to a corner space, the corner itself generally includes 2 vertical posts and solid in-fill to carry the load of the structure above it.

The present disclosure is directed towards overcoming one or more of the problems identified above and/or providing advantages over prior windows, assemblies, and methods.

SUMMARY

The inventive subject matter provides a corner window lite assembly for installation on a portion of a building, for example, a corner. The assembly can comprise a window lite that comprises a first lite portion and a second lite portion that form a first angle between 45-135 degrees, for example, about 90 degrees. The window lite can comprise a single lite piece (e.g., a single piece of glass and/or transparent plastic), or multiple lite pieces (e.g., multiple pieces of glass and/or transparent plastic) coupled together, for example, via a silicone caulking or other sealant. The assembly further comprises a frame structure that frames the window lite.

The inventive subject matter also provides a corner window lite assembly comprising a curved window lite having an outer perimeter, and a frame structure that frames the window and includes a window lite mounting flange assembly that attaches to substantially all of the outer perimeter of the curved window lite.

The frame structures for the angled and/or curved window lite may comprise a header saddle including a first saddle portion and a second saddle portion that form a second angle between 45-135 degrees, for example, about 90 degrees, a base plate including a first base portion and a second portion that form a third angle between 45-135 degrees, for example, about 90 degrees, a first vertical post that extends between the first saddle portion and the first base portion, and a second vertical post that extends between the second saddle portion and the second base portion.

In some contemplated aspects, the frame structure comprises a window lite mounting flange assembly having a first flange assembly portion coupled to the header saddle, a second flange assembly portion coupled to the base plate, a third flange assembly portion coupled to the first vertical post, and a fourth flange assembly portion coupled to the second vertical post. A set of back plates may be provided that couple to the first and second saddle portions via a set of fasteners (e.g., bolt receivers and bolts). The window lite mounting flanges and assemblies may be simple or compound.

The inventive subject matter also provides methods for retrofitting a corner window lite assembly into a portion of an existing building or placing it into a structure when newly built. The corner lite assembly can comprise a frame structure that frames and/or is configured to frame an angled and/or curved window lite. The window lite may comprise a single window, or can comprise two or more windows that couple together to form the angled or curved window lite. For example, the two or more windows can be sealed together at the window juncture with a high performance silicone caulking that does not substantially affect a view. Steps of contemplated methods may comprise, for example, sandwiching a first header of a building structure between a first header saddle portion and a back plate, fastening the first header, back plate and first header saddle portions together via a set of bolts, sandwiching a second header of a building structure between a second header saddle portion and a second back plate, wherein the second header extends at an angle of between 45-135 degrees (e.g., 90 degrees) from the first header, fastening the second header, second back plate and second header saddle portions together via a second set of bolts, and fastening the base plate to one or more sills and/or flooring components of a building structure and/or slab beneath the building structure via one or more fasteners.

The frame structure and/or the corner window lite assembly can advantageously be sized, dimensioned and configured to carry a load of the portion of the building above and/or around which it is installed, for example, a corner portion of a building having 1, 2, 3, 4, 5 or even more floors. For example, the frame structure and/or assembly can be standardized to carry the weight of one, two, or even several posts that are each at least 2 inches×4 inches×6 feet, or be structurally rated to carry any conventional load that may be desired. Viewed from another perspective, the corner window lite assembly of the inventive subject matter can be retrofitted into a building corner while leaving the horizontal structural load members (e.g., header) in place, and replacing the vertical corner posts with the new assembly. Such retrofitting advantageously creates a structurally sound and economical installation of a corner window lite. The assembly may additionally or alternatively be installed in a new construction where the structural lite assembly can be placed in lieu of the conventionally framed corner.

Other advantages and benefits of the disclosed system and methods will be apparent to one of ordinary skill with a review of the following detailed description.

BRIEF DESCRIPTION OF THE DRAWINGS

The details of embodiments of the present disclosure, both as to their structure and operation, can be gleaned in part by study of the accompanying drawings, in which like reference numerals refer to like parts, and in which.

DETAILED DESCRIPTION

The detailed description, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent that those skilled in the art will be able to understand the disclosure without these specific details. In some instances, well-known structures and components are shown in simplified form for brevity of description. Some of the surfaces have been left out or exaggerated for clarity and ease of explanation.

The inventive subject matter provides corner and/or curved window lite assemblies, and allows for the installation of the assembly at a structural component of an existing or new building that has a solid non-transparent and non-translucent corner. For example, the assembly may be installed in a corner between two adjacent windows and/or doors (e.g., sliding glass doors). A typical building corner having two windows and/or door units placed on either side has two opposing posts that support the beam or header over the adjacent existing windows and/or doors. The space between the adjacent windows and/or doors (e.g., the corner) is solid and filled to carry the load above it. Advantageously, such a building corner can be retrofitted with an assembly of the inventive subject matter to increase the view area and create a more open effect from the interior of the building to the exterior. Installation of the assembly can have the effect of creating a continuous window lite from the two adjacent window or door installations.

As used herein, the term "building" should be interpreted broadly to include any structure (preferably wood-framed) with walls, including for example, a house, an apartment complex, an apartment unit, a condominium, a store, a factory, a commercial building, and/or an office space.

Figure 1A:
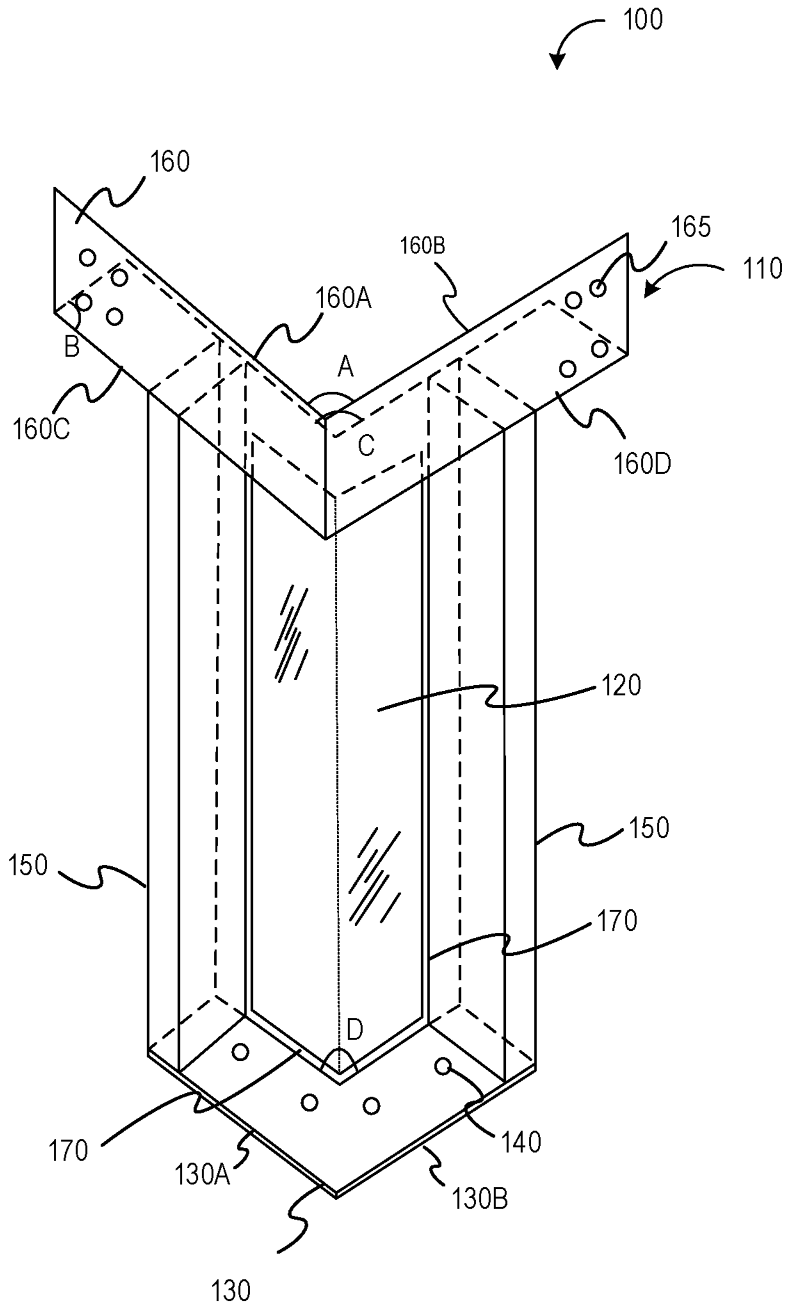
FIG. 1A illustrates a front view of a first embodiment of a window lite assembly of the inventive subject matter.
Figure 1B:
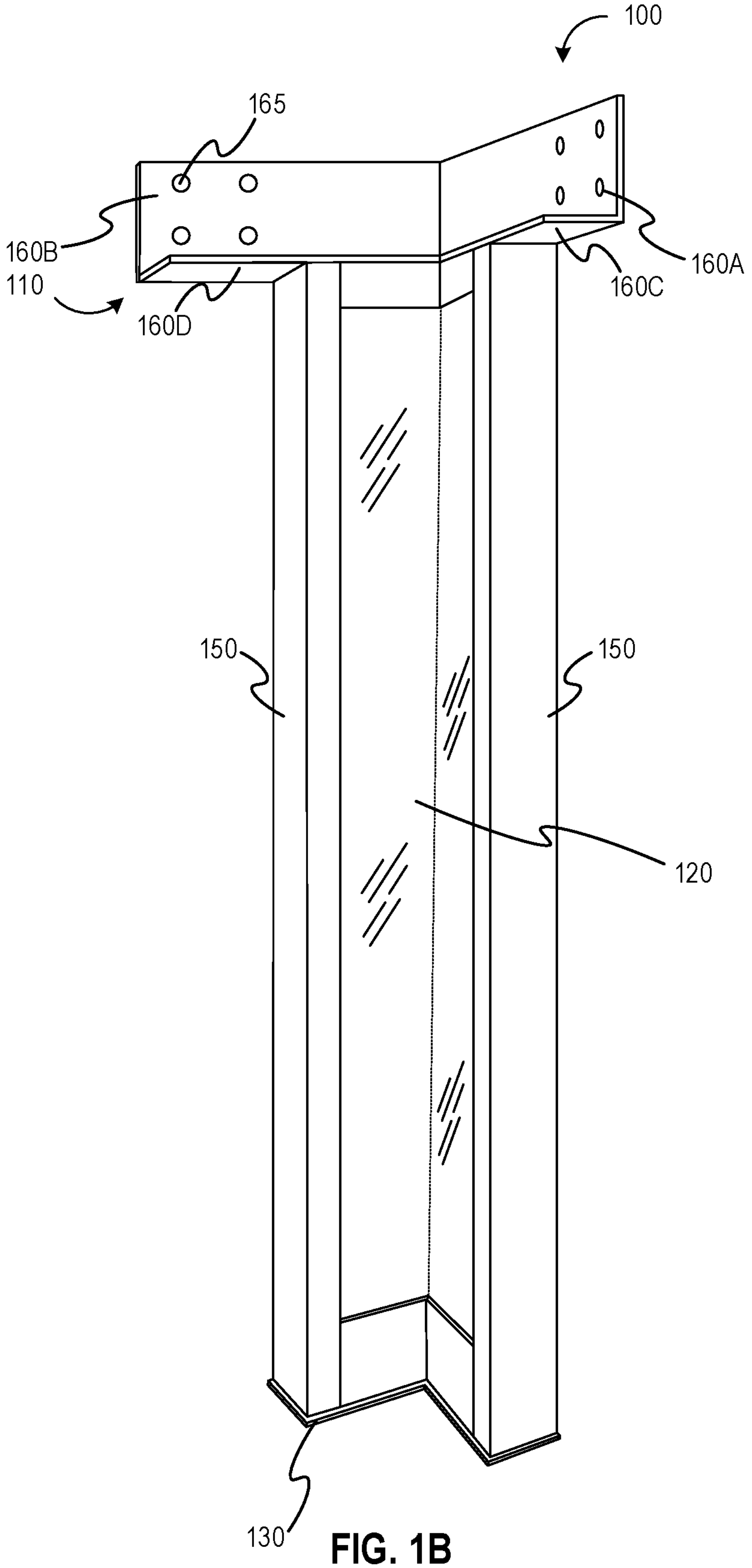
FIG. 1B illustrates a rear view of the window lite assembly of FIG. 1.

FIGS. 1A and 1B illustrate an embodiment of a corner window lite assembly 100 of the inventive subject matter. Assembly 100 comprises a frame structure 110 and a window lite 120. Frame structure 110 may be integral with window lite receiving flange assembly 170, and be made of a metal (such as aluminum and/or steel) and/or other suitable material(s) to carry, or assist in carrying, the load of the building structure where assembly 100 will be installed (e.g., carry load of the load-bearing structure assembly 100 is replacing). This new frame and window lite assembly 100 replaces the wood framed vertical load members (typically 4×4 posts), and may be installed to introduce a corner lite at a previously solid filled corner.

Frame structure 110 comprises a header saddle 160, which is sized and dimensioned to couple with a header of the building structure. Header saddle 160 comprises a first portion 160A, a second portion 160B, a third portion 160C, a fourth portion 160D, and one or more sets of bolt receivers 165 for fastening to the header and/or a back plate as further described below. An angle A is formed by first and second portions 160A and 160B, an angle B is formed between first and third portions 160A and 160C, and an angle C is formed between third and fourth portions 160C and 160D. Angle A may be, for example, between 10-175 degrees (e.g., between 45-135 degrees, between 70-110 degrees, about 90 degrees). Similarly, angle B may be any suitable angle, but will generally be about 90 degrees as most headers form about a 90 degree angle. Angle C may also be, for example, between 10-175 degrees (e.g., between 45-135 degrees, between 70-110 degrees, about 90 degrees). As used herein, the terms "substantially" and "about" should be interpreted to mean within 10%. Thus, the term "about 90 degrees" should be interpreted to mean 81-99 degrees, inclusive. It is also contemplated that in some embodiments, the header saddle may be linear, and/or may be curved.

Frame structure 110 further comprises one or more vertical posts 150 and a bottom plate 130. Vertical posts 150 extend between header saddle 160 and a bottom plate 130, and are in some embodiments metal vertical posts 150 that are each affixed to a metal header saddle 160 and a metal bottom plate 130. Bottom plate 130 includes a first portion 130A and a second portion 130B, which may form an angle D. Angle D may be any suitable angle, for example, between 10-175 degrees (e.g., between 45-135 degrees, between 70-110 degrees, about 90 degrees). Often, but not always, portions 160C and 160D will be parallel to portion 130A and 130B, respectively, and angle C and angle D will be the same or substantially the same. In the embodiment shown, the combination of header saddle 160, vertical posts 150 and bottom plate 130 forms a frame around the perimeter of window lite 120. Window lite 120 is a glass or other transparent and/or translucent material that allows a person inside the building to see out, and is coupled to one or more window lite receiving flange assembly portions that make up window lite receiving flange assembly 170 that extend from the header saddle 160, vertical posts 150, and/or bottom plate 130. The flange assembly(ies) 170 can have any suitable height, width, and thickness, and can comprise a single piece or multiple pieces and/or portions (e.g., 4 separate portions with each portion having between 2-50, between 2-10, between 2-5 pieces that join together as further described below).

It is contemplated that the frame structure can be of any suitable height and width, for example, based on the solid filled-in portion of the building the assembly will replace.

The frame structure may have a height of between 1 and 50 feet, between 3 and 25 feet, between 5 and 25 feet, between 5 and 10 feet, or any other suitable height. The frame structure may have a width of between 3 inches and 10 feet, between 3 inches and 5 feet, between 5 inches and 4 feet, between 1 and 3 feet, or any other suitable width. The frame structure may also have any suitable height to width ratio, including for example between 1:20 and 20:1, between 1:10 and 10:1, between 1:5 and 5:1, between 2:1 and 20:1, between 2:1 and 10:1, at least 2:1, at least 3:1, at least 4:1, at least 5:1, at least 8:1, or any other suitable ratio. The height of the frame structure can be considered a vertical height between an uppermost portion of the header saddle and a bottommost portion of the bottom (base) plate. The width of the frame structure can be considered a horizontal line between outermost portions of the vertical posts (or header saddle where the header saddle extends past the vertical posts).

In some contemplated embodiments, the frame structure 110 can be made of a single piece of metal or other material. In other embodiments, the frame structure 110 can comprise separate pieces that are assembled together.

The window lite may also be of any suitable height and width, for example, to have about the same height as adjacent windows and/or window portions of sliding doors. The window lite (which may comprise one or more transparent and/or translucent pieces) may have a height of between 1 and 50 feet, between 3 and 25 feet, between 5 and 25 feet, between 5 and 10 feet, or any other suitable height. The window lite may have a width of between 3 inches and 10 feet, between 3 inches and 5 feet, between 5 inches and 4 feet, between 1 and 3 feet, or any other suitable width. The window lite may also have any suitable height to width ratio, including for example between 1:20 and 20:1, between 1:10 and 10:1, between 1:5 and 5:1, between 2:1 and 20:1, between 2:1 and 10:1, at least 2:1, at least 3:1, at least 4:1, at least 5:1, at least 8:1, or any other suitable ratio. The height of the window lite can be considered a vertical height between an uppermost portion of the window lite and a bottommost portion of the window lite. The width of the window lite can be considered a horizontal line between outermost portions of the window lite (e.g., a straight line between the right and left side edges of the window lite that couple with the flange assembly).

Figure 2:
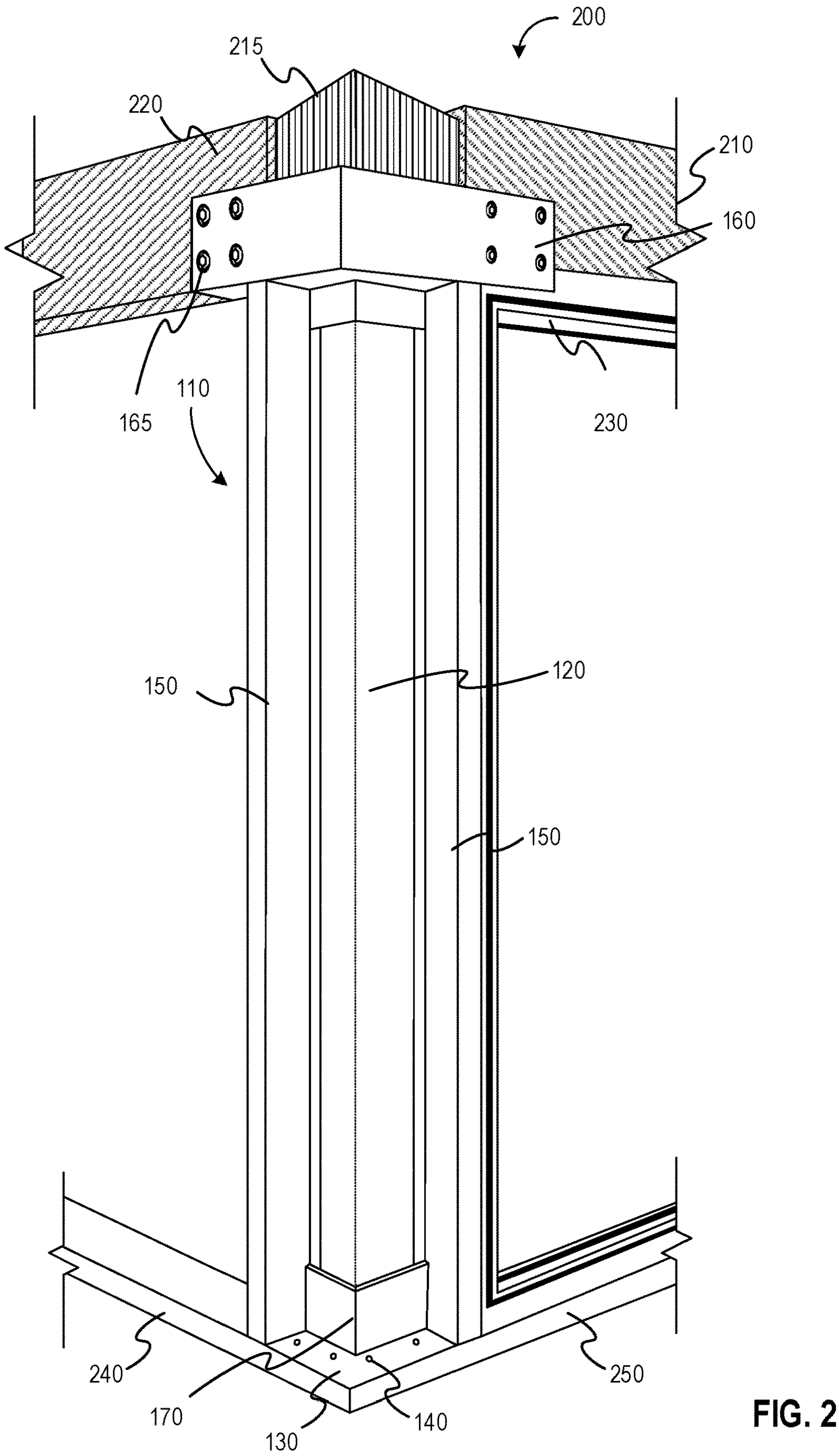
FIG. 2 illustrates the window lite assembly of FIG. 1 installed on a corner portion of a building.

FIG. 2 illustrates an assembly 100 mounted onto a portion of an existing building structure 200. Structure 200 comprises headers or beams 210 and 220, one, some or all of which may extend above assembly 100 (or portion thereof) and a wall portion, a sliding door (e.g., 230), and/or a window adjacent the portion where assembly 100 is installed. Header saddle 160 is coupled to headers 210 and 220 via bolts received by bolt receivers 165. The ends of headers 210 and 220 closest to the corner may vertically align with the sides of vertical posts 150 closest to the corner (e.g., vertically aligned, within 2 inches, within 1 inch). The void between the ends of headers 210 and 220 may comprise wood filler 215 and/or added header extension portions that are attached to the existing headers 210 and 220 and extend substantially to the corner of the building structure 200. Structure 200 also includes sills 240 and 250 (and/or slab and/or floor of the structure), one or both of which may extend below assembly 100 and a wall portion, a sliding door (e.g., 230), and/or a window adjacent the portion where assembly is installed. Bottom plate 130 of assembly 100 is coupled to sills 240 and 250 (and/or slab and/or floor of the structure) via bolts received by bolt receivers 140.

Figure 3A:
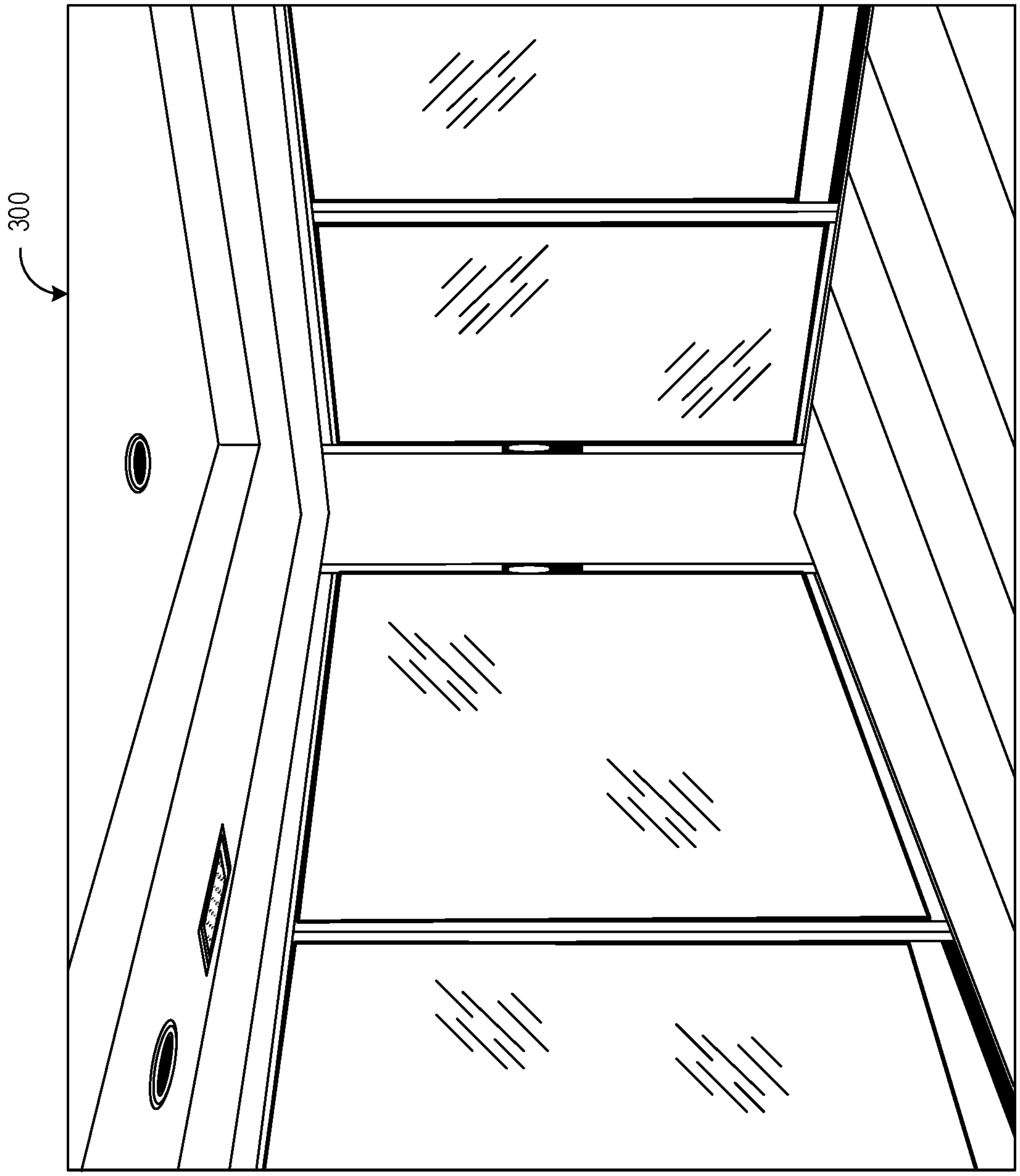
FIG. 3A illustrates an interior of a room before a remodel.
Figure 3B:
FIG. 3B illustrates the interior of the room in FIG. 3A after a remodel including installation of a window lite assembly of the inventive subject matter.

FIG. 3A illustrates room 300 before installation of an assembly of the inventive subject matter. FIG. 3B illustrates room 300 after a remodel that includes installation of assembly 100 in a corner portion of the room. Given the appeal of having a corner lite between two existing windows or doors that are on each side of a building corner, the new assembly is a low cost and elegant way that increases the view and light at what was once a solid (non-transparent and non-translucent) corner keeping intact the horizontal structural components (e.g., headers and slab and/or sills) of the building which are expensive to alter to get a similar effect. The assembly can give the effect of creating a continuous window lite from the two adjacent window or door installations; increasing the view area and creating an open effect from the interior of the building to the exterior. The new assembly can replace existing structural elements engineered to carry the appropriate building loads.

For ease of installation, it may be desirable to have an existing structure with a post support present over and/or under each adjacent window and/or door (e.g., one or more horizontal headers and/or one or more sills). This style of existing structural assembly is present in virtually all conventionally framed residential structures or another way said probably in excess of 95% of all wood frame homes in the United States.

Figure 4:
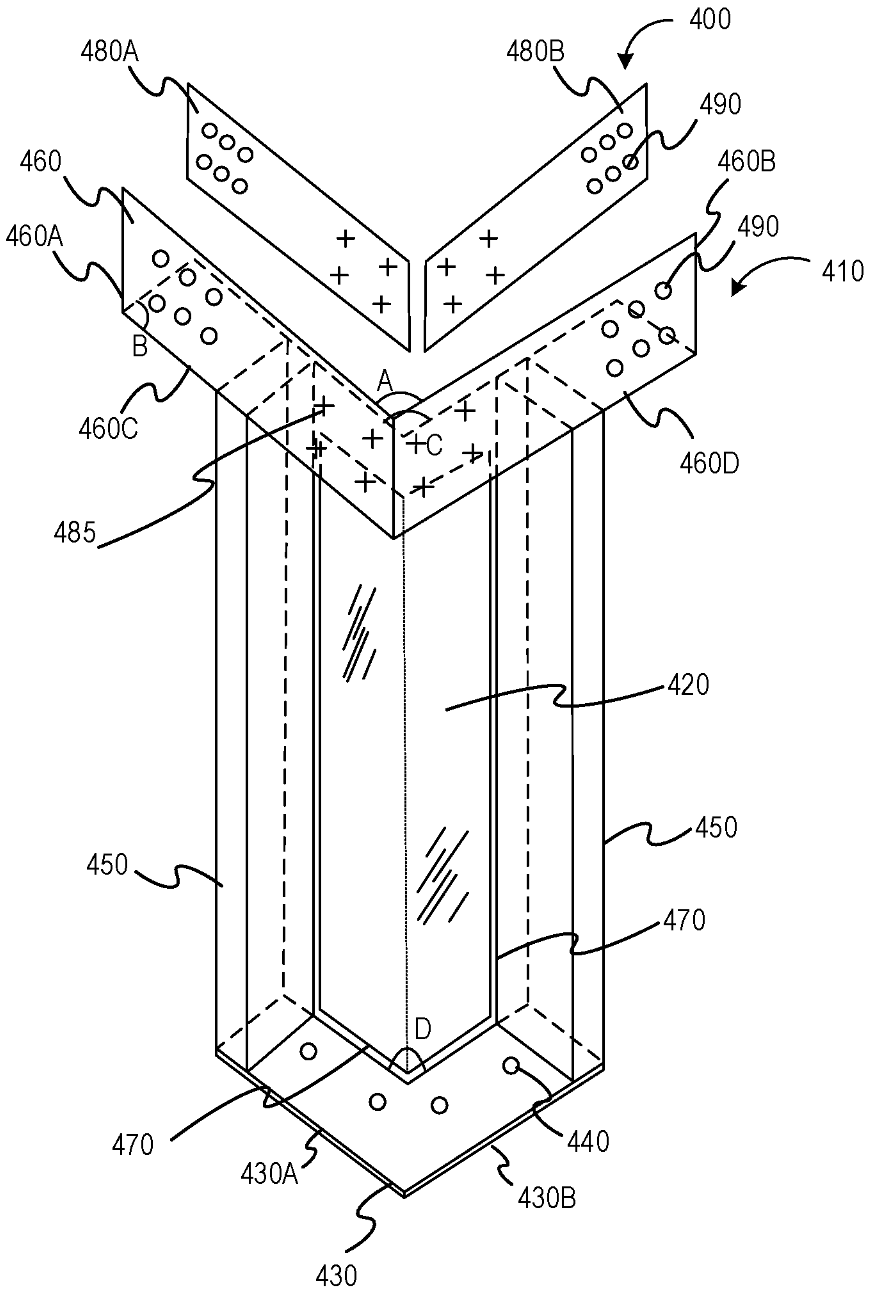
FIG. 4 illustrates an embodiment of a window lite assembly having back plates for, among other things, an open corner not having headers that extends to the corner.

FIG. 4 illustrates another embodiment of a window lite assembly 400, which may be especially useful for installation in open corners of building structures that do not include headers or header extensions that extend all the way to the corners. Assembly 400 comprises a frame structure 410 and a window lite 420. Frame structure 410 is integral with window lite receiving flange assembly 470, and be made of a metal (such as aluminum) or other suitable material(s) to carry, or assist in carrying, the load of the building structure where assembly 400 will be installed (e.g., carry load of the load-bearing structure assembly 400 is replacing). This new frame and window lite assembly 400 replaces the wood framed vertical load members (typically 4×4 posts), and may be installed to introduce a corner lite at a previously solid filled corner.

Frame structure 410 comprises a header saddle 460, which is sized and dimensioned to couple with a header and/or header extension portion and/or filler of the building structure. Header saddle 460 comprises a first portion 460A, a second portion 460B, a third portion 460C, a fourth portion 460D, and one or more sets of bolt receivers 490 for fastening to the header and/or back plates 480A and 480B, which may comprise complementary bolt receivers 490. An angle A is formed by first and second portions 460A and 460B, an angle B is formed between first and third portions 460A and 460C, and an angle C is formed between third and fourth portions 460C and 460D. Angle A may be, for example, between 10-175 degrees (e.g., between 45-135 degrees, between 70-110 degrees, about 90 degrees). Similarly, angle B may be any suitable angle, but will generally be about 90 degrees as most headers form about a 90 degrees angle. Angle C may also be, for example, between 10-175 degrees (e.g., between 45-135 degrees, between 70-110 degrees, about 90 degrees).

Back plates 480A and 480B may be beneficial in providing support for the load above and/or adjacent the window lite assembly, for example, where an assembly is installed in a framed corner where existing headers stop at/above the vertical posts, thereby leaving a corner portion above and between the vertical posts without a support. Back plates 480A and 480B may fasten to and extend from existing headers in the building structure and extend to the corner to provide adequate support to a load above and/or adjacent the assembly 400. The back plates can be especially beneficial where there are one or more floors above the portion of the building structure where the assembly is installed, and/or where the assembly header saddle would be insufficient to support the load of the building structure above it. In the embodiment illustrated in FIG. 4, the header saddle 460 and back plates 480A, 480B extend from the corner of the assembly to beyond the vertical posts 450 (e.g., between 0.5 and 3 feet, between 0.1 and 5 feet, between 0.4 and 2 feet beyond vertical posts on each side). It is contemplated that in some embodiments, the header saddle portions and back plates may be longer than a first and/or second portion of the base plate 430A, 430B. The portion of the saddle 460 and back plates 480A, 480B that extend beyond the vertical posts includes bolt receivers 490. The bolts may be received by bolt receivers 490 of the saddle, the back plate, and the header that extends between the saddle and back plate. The portion of the saddle 460 and the back plates 480A, 480B that extend between the vertical posts can also include fastener receivers (e.g., for receiving wood screws or other fasteners). The fastener receivers and fasteners for the portion of the saddle and back plates that extend between the vertical posts may be the same or different from the fastener receivers and fasteners for the portion of the saddle and back plates that extend past the vertical posts. A space between the saddle and back plates, for example a space that does not include a header and/or header extension, may be filled with a suitable filler material.

Frame structure 410 further comprises one or more vertical posts 450 (2 in FIG. 4) and a bottom plate 430. Vertical posts 450 extend between header saddle 460 and a bottom plate 430, and are in some embodiments metal vertical posts 450 that are each welded to a metal header saddle 460 and a metal bottom plate 430. Bottom plate 430 includes a first portion 430A and a second portion 430B, which may form an angle D. Angle D may be any suitable angle, for example, between 10-175 degrees (e.g., between 45-135 degrees, between 70-110 degrees, about 90 degrees). Vertical posts may extend about perpendicularly to the base plate and/or header saddle. In some embodiments, portions 460C and 460D will be parallel to portion 430A and 430B, respectively, and angle C and angle D will be the same or substantially the same. In the embodiment shown, the combination of header saddle 460, vertical posts 450 and bottom plate 430 forms a frame around the perimeter of window lite 420. Window lite 420 is one or more glass or other transparent and/or translucent pieces of material that allows a person inside the building to see out, and is coupled to a window lite receiving flange assembly 470 that extend from the header saddle 460, vertical posts 450, and/or bottom plate 430. The flange assembly 470 can have any suitable height, width, and thickness, and can comprise a single piece, multiple pieces and/or multiple portions that comprise one or more pieces (e.g., flanges, gaskets, trim fasteners).

It is contemplated that the frame structure can be of any suitable height and width, for example, based on the solid filled-in portion of the building the assembly will replace. The frame structure may have a height of between 1 and 50 feet, between 3 and 25 feet, between 5 and 25 feet, between 5 and 10 feet, or any other suitable height. The frame structure may have a width of between 3 inches and 10 feet, between 3 inches and 5 feet, between 5 inches and 4 feet, between 1 and 3 feet, or any other suitable width. The frame structure may also have any suitable height to width ratio, including for example between 1:20 and 20:1, between 1:10 and 10:1, between 1:5 and 5:1, between 2:1 and 20:1, between 2:1 and 10:1, at least 2:1, at least 3:1, at least 4:1, at least 5:1, at least 8:1, or any other suitable ratio. The height of the frame structure can be considered a vertical height between an uppermost portion of the header saddle and a bottommost portion of the bottom (base) plate. The width of the frame structure can be considered a horizontal line between outermost portions of the vertical posts (or header saddle where the header saddle extends past the vertical posts).

The window lite may also be of any suitable height and width, for example, to have about the same height as adjacent windows and/or window portions of sliding doors. The window lite (which may comprise one or more transparent and/or translucent pieces) may have a height of between 1 and 50 feet, between 3 and 25 feet, between 5 and 25 feet, between 5 and 10 feet, or any other suitable height. The window lite may have a width of between 3 inches and 10 feet, between 3 inches and 5 feet, between 5 inches and 4 feet, between 1 and 3 feet, or any other suitable width. The window lite may also have any suitable height to width ratio, including for example between 1:20 and 20:1, between 1:10 and 10:1, between 1:5 and 5:1, between 2:1 and 20:1, between 2:1 and 10:1, at least 2:1, at least 3:1, at least 4:1, at least 5:1, at least 8:1, or any other suitable ratio. The height of the window lite can be considered a vertical height between an uppermost portion of the window lite and a bottommost portion of the window lite. The width of the window lite can be considered a horizontal line between outermost portions of the window lite (e.g., a straight line between the right and left side edges of the window lite that couple with the flange assembly). The window lite may have any suitable shape, including, for example, two rectangular lite portions that are joined together, two half-oval lite portions that are joined together, two triangular lite portions that are joined together, and/or any combination thereof. The window lite may comprise 1, 2, 3, or any suitable number of window lite components coupled together. For example, the window lite may comprise a single piece of curved glass.

Figure 5:
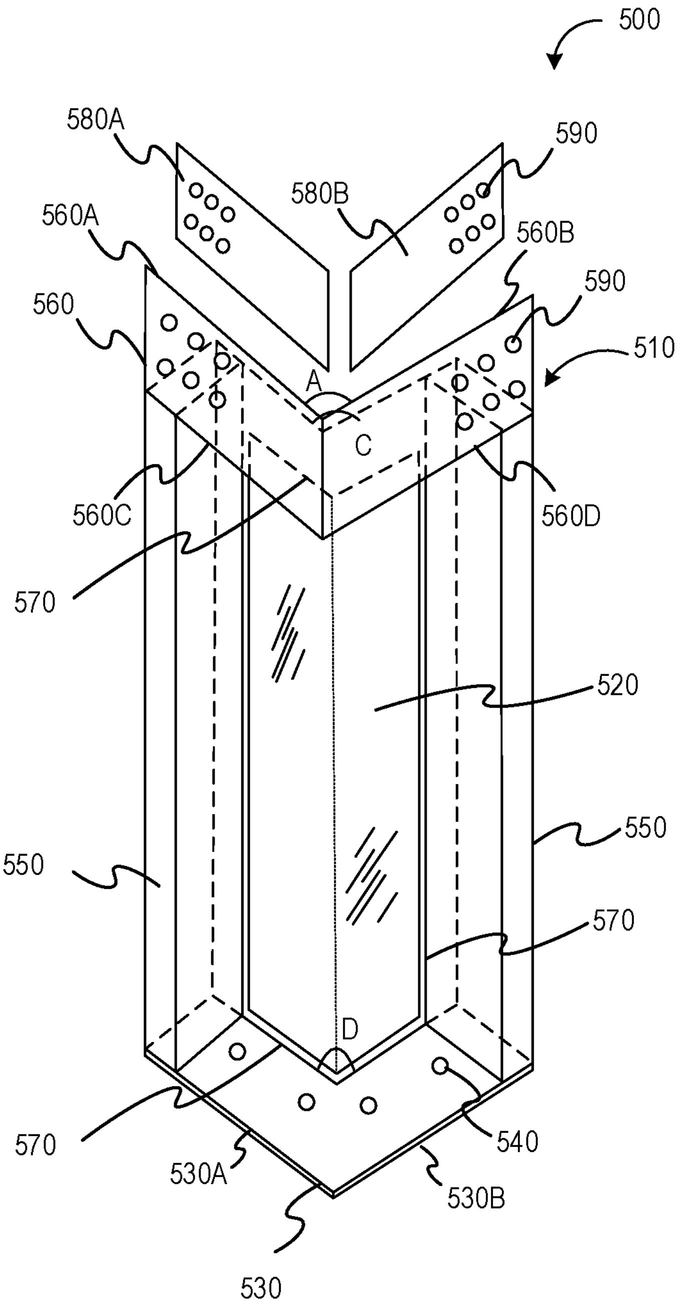
FIG. 5 illustrates an embodiment of a window lite assembly having back plates for, among other things, a corner having headers or header extensions that extend to the corner.

FIG. 5 illustrates another embodiment of a window lite assembly 500 that is almost identical to window lite assembly 400 except that the header saddle and back plates do not extend substantially beyond the vertical posts. The assembly of FIG. 5 may be especially useful where the existing headers above the assembly are extended (e.g., where extension header portions are added to extend from the existing headers to the corner) such that there is complete header support (and added stiffness and bearing ability) above the window lite and/or assembly. Assembly 500 comprises a frame structure 510 and a window lite 520. Frame structure 510 comprises window lite receiving flange assembly 570, and is made of a metal (such as aluminum) or other suitable material(s) to carry, or assist in carrying, the load of the building structure where assembly 500 will be installed (e.g., carry load of the load-bearing structure assembly 500 is replacing). Assembly 500 may replace the wood framed vertical load members (typically 4×4 posts), and may be installed to introduce a corner lite at a previously solid filled corner.

Frame structure 510 comprises a header saddle 560, which is sized and dimensioned to couple with a header of the building structure. Header saddle 560 comprises a first portion 560A, a second portion 560B, a third portion 560C, a fourth portion 560D, and one or more sets of bolt receivers 590 for fastening to the extended header portions and/or back plates 580A and 580B, which may comprise complementary bolt receivers 590. An angle A is formed by first and second portions 560A and 560B, an angle B is formed between first and third portions 560A and 560C, and an angle C is formed between third and fourth portions 560C and 560D. Angle A may be, for example, between 10-175 degrees (e.g., between 45-135 degrees, between 70-110 degrees, about 90 degrees). Similarly, angle B may be any suitable angle, but will generally be about 90 degrees as most headers form about a 90 degrees angle. Angle C may also be, for example, between 10-175 degrees (e.g., between 45-135 degrees, between 70-110 degrees, about 90 degrees).

Back plates 580A and 580B may be beneficial to include, for example, where an assembly is installed in a framed corner where existing headers that stop at/above the vertical posts are extended to the corner with header extension portions, thereby filling a corner portion above and between the vertical posts with the header extension portions. In the embodiment illustrated in FIG. 5, the header saddle 560 and back plates 580A, 580B do not extend substantially beyond the vertical posts 550. Thus, the bolt receivers 590 are positioned to receive bolts such that the bolts extend through the header extension portions above the window lite 520.

Frame structure 510 further comprises one or more vertical posts 550 and a bottom plate 530. In the embodiment illustrated in FIG. 5, bottom plate 530 and header saddle 510 may have substantially the same width. Vertical posts 550 extend between header saddle 560 and a bottom plate 530, and are in some embodiments metal vertical posts 550 that are each affixed to a metal header saddle 560 and a metal bottom plate 530. Bottom plate 530 includes a first portion 530A and a second portion 530B, which may form an angle D. Angle D may be any suitable angle, for example, between 10-175 degrees (e.g., between 45-135 degrees, between 70-110 degrees, about 90 degrees). Often, portions 560C and 560D will be parallel to portion 530A and 530B, respectively, and angle C and angle D will be the same or substantially the same. In the embodiment shown, the combination of header saddle 560, vertical posts 550 and bottom plate 530 forms a frame around the perimeter of window lite 520. Window lite 520 is a glass or other transparent and/or translucent material that allows a person inside the building to see out, and is coupled to a window lite receiving flange assembly 570 that extend from the header saddle 560, vertical posts 550, and/or bottom plate 530. The flange assembly 570 can have any suitable height, width, and thickness, and can comprise a single piece, multiple pieces (e.g., 4 pieces that join together), and/or multiple portions that each comprise a single piece or multiple pieces.

Figure 6:
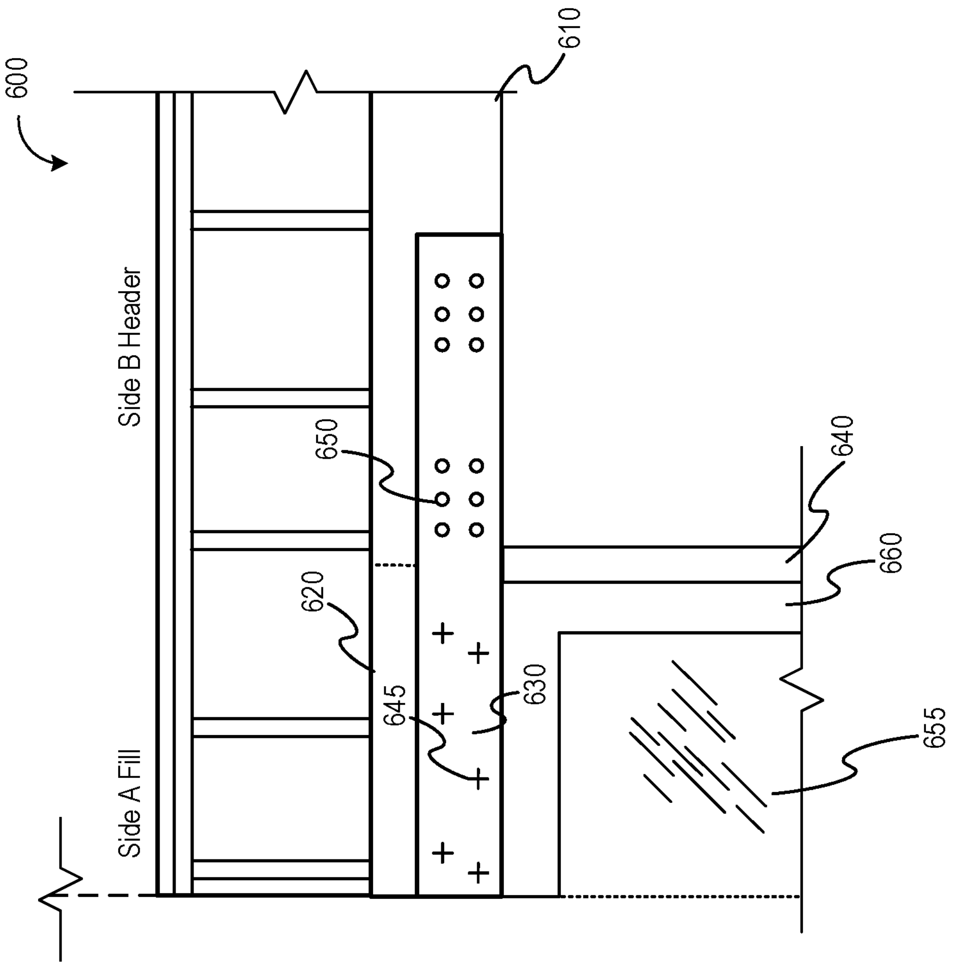
FIG. 6 illustrates a portion of a window lite assembly for, among other things, an open corner not having headers that extends to the corner.

FIG. 6 illustrates a top right portion of an assembly 600 of the inventive subject matter (left side a mirror image) installed in a corner of a building. Assembly 600 includes all features and elements of assembly 400, including a back plate 630, vertical post 640 (e.g., an aluminum post), window lite mounting flange assembly 660, and a window lite 655. The building includes a header 610 that extends only to a point above vertical posts 640. The dotted lines on the left side of the Figure represent the corner. For example, the header 610 may extend to a point directly above a portion of vertical post 640 but not extend all the way to a corner of the building. One or more filler blocks 620 are included between the header saddle (not shown), plate 630, header 610, and the corner of the building. Plate 630 comprises a first portion that is positioned over the filler block, and a second portion that is positioned over the header 610. In some embodiments, about an equal length of the back plate may be configured for positioning over the filler as the header. First portion includes a set of staggered fastener openings 645 for receiving SDS wood screws or other fasteners. Complementary screw openings may be positioned on a portion of the header saddle positioned over the filler block. Second portion of plate 630 comprises a second set of fastener receivers 650, which may be the same as, or different from, fastener openings 645. Fastener receivers 650 may be sized and dimensioned to receive any suitable fasteners, such as thru bolts (which may be load bearing). Complementary fastener receivers may be positioned on a portion of the header saddle positioned over header 610.

Figure 7:
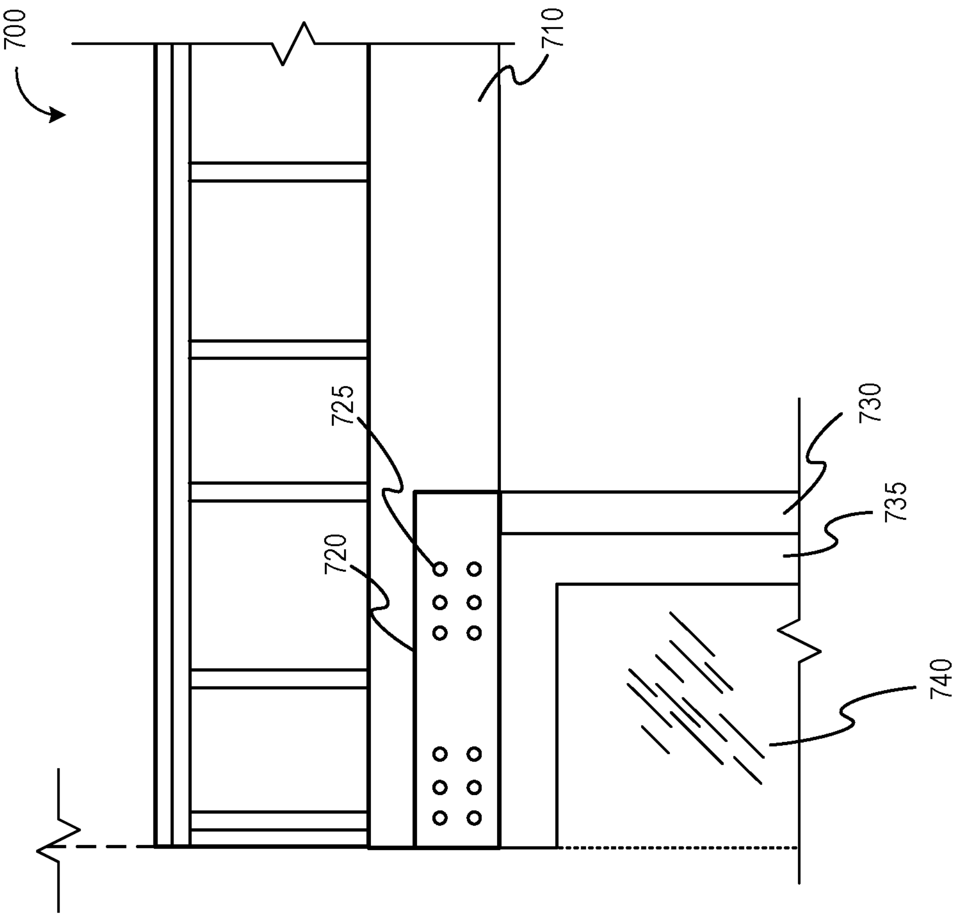
FIG. 7 illustrates a portion of a window lite assembly for, among other things, a corner having headers or header extensions that extend to the corner.

FIG. 7 illustrates a top right portion of an assembly 700 of the inventive subject matter (left side a mirror image) installed in a corner of a building. Assembly 700 includes all features and elements of assembly 500, including a back plate 720, vertical post 730 (e.g., an aluminum post), window lite mounting flange assembly 735, and a window lite 740. The building includes a header 710 that extends all the way or substantially to a corner (e.g., extends to within 2 inches, or within 1 inch of a corner), or is coupled with a header extension portion that extends from a free end of the existing header to the corner. The dotted lines on the left side of the Figure represent the corner. Back plate 720 comprises a set of bolt or other fastener receivers, and extends between the corner of the building and vertical post 730. The header saddle (not shown) may be positioned such that a first portion of the header saddle and the back plate 720 sandwich the header 710 (and/or header extension portion).

Figure 8:
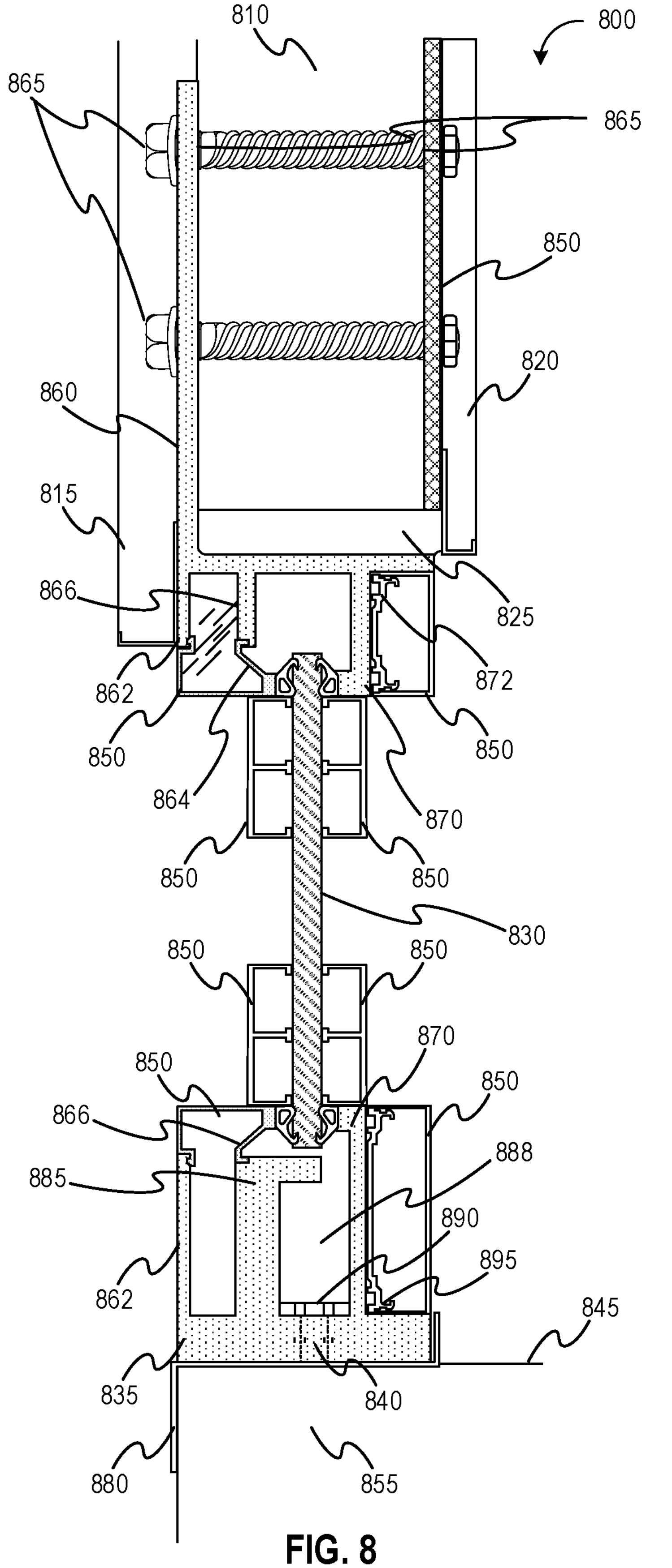
FIG. 8 is a cross-sectional view of the top and bottom of a window lite assembly.

FIG. 8 is a side cross-sectional view of a window lite assembly installed in a portion of a building. Assembly 800 comprises a header saddle 860 and back plate 850 that sandwich and are mounted to header 810. Bolts 867 extend through bolt receivers 865 of the header saddle 860, header 810, and back plate 850 (when installed) and may be held in place by bolt heads and nuts. An exterior finish 815 may surround an outer surface of header saddle 860, an interior finish, typically drywall 820 or paneling may surround an outer surface of back plate 850, and a shim 825 or other component may be positioned between header 810, an upper surface of a header saddle portion that extends substantially horizontally, drywall 820, and a bottom surface of back plate 850 when the window lite assembly 800 is installed.

Header saddle portions that face the base plate (e.g., 160*c*, 160*d* in FIG. 1) may comprise or be coupled and/or attached to one or more trim flange assemblies and/or fasteners 862 configured to couple with a trim 850, one or more gasket flanges 866 that include or couple to a gasket 864, a window mounting/gasket flange that includes or couples to a gasket 864, and/or one or more mounting bracket 872. The window mounting flange 870, gasket 864 and gasket flange 866 may collectively be considered a window lite mounting flange assembly portion. The vertical posts (not shown) may similarly include one or more flanges and gaskets as described in connection with FIG. 9. Providing connectors or fasteners for coupling to trims may be very beneficial for aesthetic purposes, for example, to allow trims that match features of the building to easily be installed and cover components of the window lite assembly. The trims may be hollow, and/or may be provided with an optional thermal filler material that does not transfer temperature and/or energy so that they are solid filled in components.

The base plate 835 includes one or more bolt receivers 840 that receives a bolt or other fastener that extends through base plate 835 and a slab, beam and/or sill 855 beneath the assembly and floor 845. An upper surface of base plate includes or is coupled and/or attached to one or more trim flanges 862, structural flanges 885, for example with a stop, gasket flanges 866 and gasket 864, window mounting flanges 870, fasteners for trims 895, and trims 850. Once installed, a bolt head 890 may be positioned in a pitch pocket 888 between structural flange 885 and window mounting flange 870, and a sealant may fill the pitch pocket up to about the top of the structural flange 885. The gasket flange 866, gasket 864 and window mounting flange 870 may collectively be considered a second window lite mounting flange assembly portion. A flashing pan 880 may be provided to prevent air and/or water from getting underneath the window lite assembly and into the subfloor. Window lite 830 may be mounted to the window lite mounting flange assembly portions of the header saddle and base plate (and vertical posts, not shown).

Figure 9:
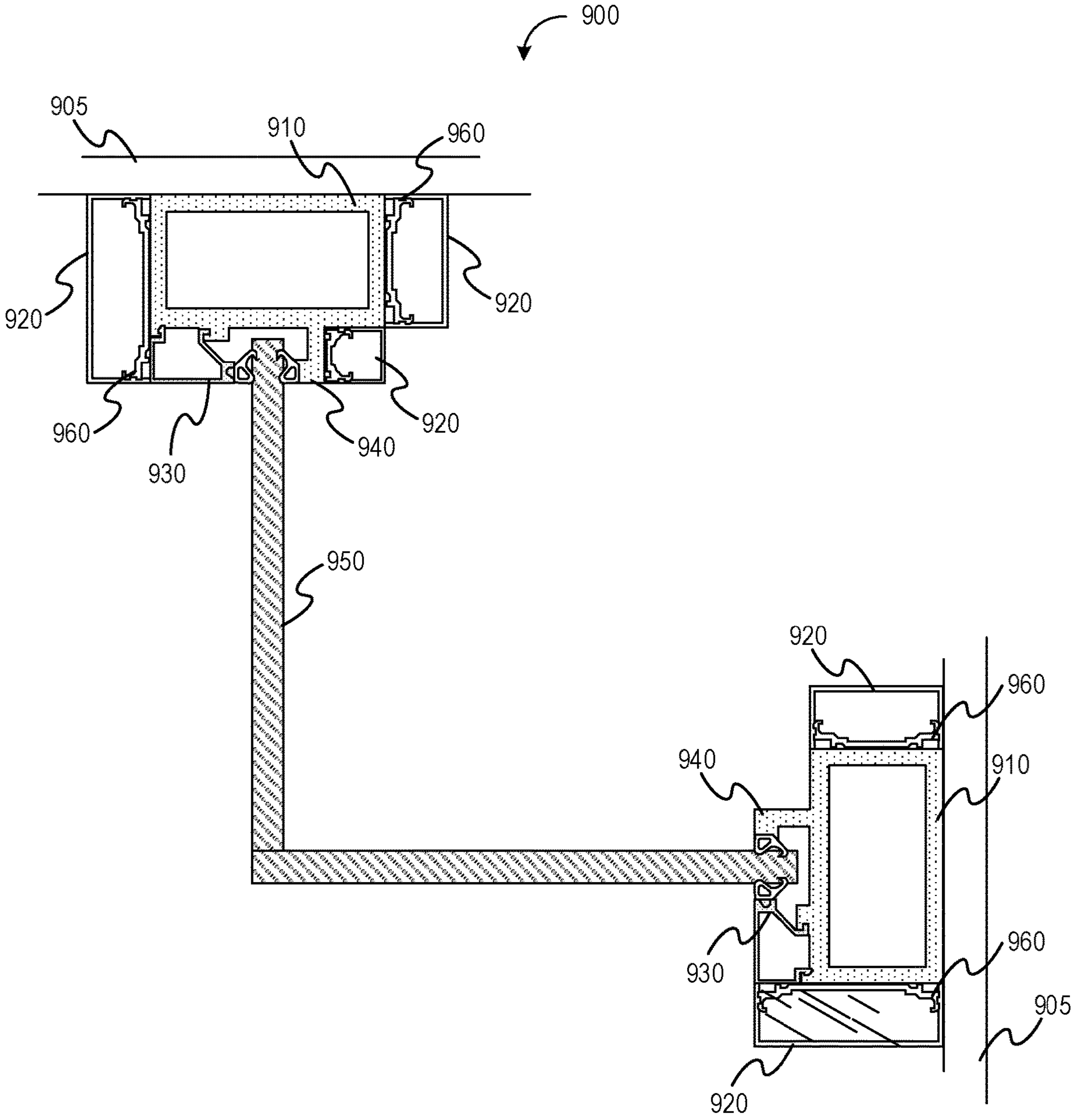
FIG. 9 is a cross-sectional view of the sides of another window lite assembly.

FIG. 9 is a bird's eye cross-sectional view of a window lite assembly mounted in a corner of a building between walls, sliding doors and/or window 905. Assembly 900 may comprise some or all of the components described above in connection with assembly 800. Assembly 900 comprises vertical posts 910, which include or are coupled with mounting brackets 960 and trims 920. Each vertical post 910 includes or is coupled with one or more window mounting flanges 940, one or more gasket flanges, and one or more gaskets 930. The window mounting flange 940, gasket 930 and gasket flange of each vertical post may collectively be considered a window lite mounting flange assembly portion. Window lite 950 (or window lite 830 of FIG. 8) may be mounted to the window lite mounting flange assembly portions of the vertical posts 910 (and header saddle and base plate, not shown). It is contemplated that where a curved window lite is desired that is rounded throughout, the window lite mounting flange assemblies can comprise rounded radius flanges.

Thus, specific corner window lite assemblies and related methods have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

As used herein, and unless the context dictates otherwise, the term "coupled to" is intended to include both direct coupling (in which two elements that are coupled to each other contact each other) and indirect coupling (in which at least one additional element is located between the two elements).

The recitation of ranges of values herein is merely intended to serve as a shorthand method of referring individually to each separate value falling within the range, and including the endpoints. Unless otherwise indicated herein, each individual value is incorporated into the specification as if it were individually recited herein.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "assembly," "mechanism," "element," "device," and the like may not be a substitute for the word "means." As such, no claim element is to be construed as a means plus function unless the element is expressly recited using the phrase "means for."

The accompanying claims and their equivalents are intended to cover such forms or modifications as would fall within the scope of the disclosure. The features and attributes of the specific example embodiments of the corner window lite assemblies and related methods disclosed above may be combined in different ways to form additional embodiments, all of which fall within the scope of the disclosure.

Although the present disclosure provides certain example embodiments and applications, other embodiments that are apparent to those of ordinary skill in the art, including embodiments which do not provide all of the features and advantages set forth herein, are also within the scope of this disclosure.

The invention claimed is:

1. A corner window lite assembly, comprising:

a window lite comprising a first lite portion and a second lite portion that form a first angle between 45-135 degrees; and a frame structure that frames the window lite, wherein the frame structure is configured to integrate into a corner portion of a building between adjacent walls of the building, and comprises:

a saddle including a first saddle portion and a second saddle portion that form a second angle between 45-135 degrees, wherein the saddle comprises a set of fastener receivers configured to receive a first set of fasteners that extend through the saddle and an existing structural load member of the building;

a base plate including a first base portion and a second base portion that form a third angle between 45-135 degrees, wherein the base plate comprises a second set of fastener receivers configured to receive a second set of fasteners that extend through the base plate and a flooring component beneath the corner window lite assembly;

a first vertical post that extends between the first saddle portion and the first base portion; and a second vertical post that extends between the second saddle portion and the second base portion.

2. The corner window lite assembly of claim 1, wherein the window lite comprises a single piece.

3. The corner window lite assembly of claim 2, wherein the single piece is curved.

4. The corner window lite assembly of claim 1, wherein the first lite portion and second lite portion are separate pieces coupled together at a juncture with a sealant.

5. The corner window lite assembly of claim 1, wherein the frame structure further comprises a window lite mounting flange assembly having a first flange assembly portion coupled to the saddle, a second flange assembly portion coupled to the base plate, a third flange assembly portion coupled to the first vertical post, and a fourth flange assembly portion coupled to the second vertical post.

6. The corner window lite assembly of claim 1, wherein the frame structure further comprises a first back plate configured to couple to the first saddle portion via the first set of fasteners such that a portion of the existing structural load member of the building is positioned between the first back plate and first saddle portion and the first set of fasteners extends through the first saddle portion, the existing structural load member of the building, and the first back plate.

7. The corner window lite assembly of claim 1, wherein each of the first angle, the second angle, and the third angle is about 90 degrees.

8. The corner window lite assembly of claim 1, wherein the frame structure is made of at least one of aluminum and steel, and wherein the corner window lite assembly is configured to, upon installation, increase a view area from an interior of the building to an exterior of the building.

9. The corner window lite assembly of claim 1, wherein the frame structure has a width of less than 10 feet.

10. The corner window lite assembly of claim 9, wherein the frame structure has a height that is at least twice as large as the width.

11. The corner window lite assembly of claim 1, wherein the corner window lite assembly is configured to, upon installation, carry a full load of the portion of the building above the corner window lite assembly.

12. The corner window lite assembly of claim 1, wherein the assembly is configured to replace an existing structural element in the corner portion of the building adjacent a sliding door and to carry a full load of the building.

13. The corner window lite assembly of claim 1, wherein the saddle further comprises a third saddle portion and a fourth saddle portion, wherein the third saddle portion and the fourth saddle portion form a fourth angle of between 45-135 degrees, wherein the first saddle portion and the third saddle portion form a fifth angle of between 45-135 degrees, and wherein the second saddle portion and the fourth saddle portion form a sixth angle of between 45-135 degrees.

14. The corner window lite assembly of claim 1, wherein upon installation in a first corner portion of the building, an exterior finish surrounds an outer surface of the saddle, and an interior finish surrounds an outer surface of at least one of the saddle and the back plate.

15. A corner window lite assembly, comprising:

a window lite comprising a first lite portion and a second lite portion sealed together at a juncture with a sealant and forming a first angle of between 45-135 degrees;

a frame structure configured to integrate the window lite into a corner portion of a building between adjacent walls of the building;

wherein the frame structure comprises:

a saddle having a first saddle portion and a second saddle portion that form a second angle between 45-135 degrees;

a set of fastener receivers configured to receive a first set of fasteners that extend through the saddle;

a base plate including a first base portion and a second base portion that form a third angle between 45-135 degrees;

a second set of fastener receivers configured to receive a second set of fasteners that extend through the base plate;

a first vertical post that extends between the first saddle portion and the first base portion; and a second vertical post that extends between the second saddle portion and the second base portion; and wherein the first lite portion has four perimeter edges and a first perimeter edge is adjacent to the first saddle portion, a second perimeter edge is adjacent to the first base portion, a third perimeter edge is adjacent to the first vertical post, and a fourth perimeter edge is sealed to the second lite portion.

16. The window lite assembly of claim 15, wherein the second lite portion has four perimeter edges and a first perimeter edge is adjacent to the second saddle portion, a second perimeter edge is adjacent to the second base portion, a third perimeter edge is adjacent to the second vertical post, and a fourth perimeter edge is sealed to the first lite portion.

17. The window lite assembly of claim 15, wherein an entire length of the fourth perimeter edge is sealed to the second lite portion.

18. The window lite assembly of claim 15, wherein at least a portion of a length of the fourth perimeter edge is sealed to the second lite portion.

* * * * *